Oct. 4, 1938.   E. C. BRUEGGEMAN   2,132,096
DEPOSITED RUBBER AND LIKE ARTICLE AND METHOD FOR MAKING SAME
Filed Aug. 6, 1937
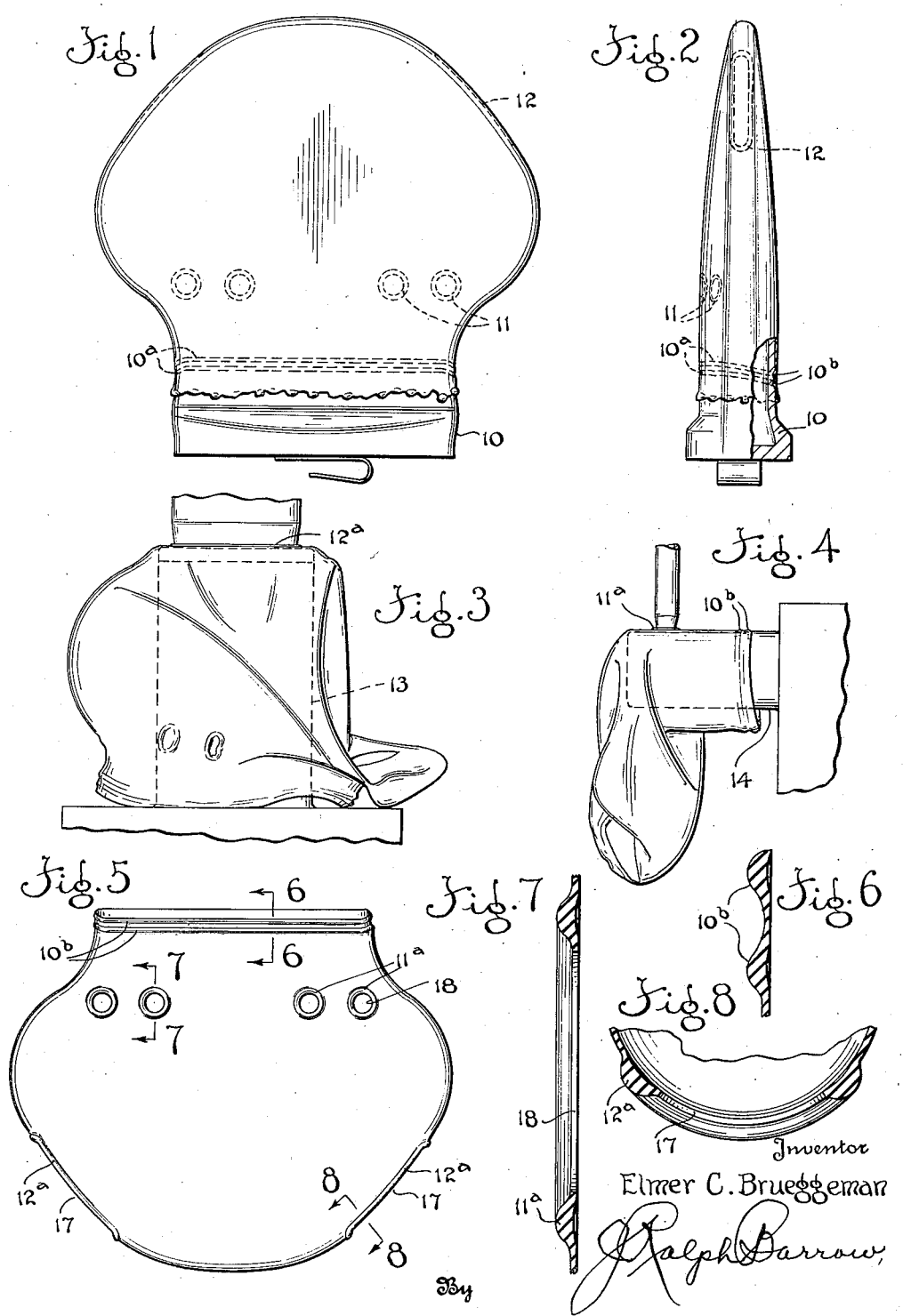

Patented Oct. 4, 1938

2,132,096

UNITED STATES PATENT OFFICE 2,132,096

DEPOSITED RUBBER AND LIKE ARTICLE AND METHOD FOR MAKING SAME

Elmer C. Brueggeman, Akron, Ohio, assignor to Seiberling Latex Products Company, Barberton, Ohio, a corporation of Ohio Application August 6, 1937, Serial No. 157,654

2 Claims. (Cl. 18—58)

This invention relates to deposited rubber or like articles and methods for making the same.

The general purpose of the invention is to provide an improved deposited rubber or like article with one or more apertures therein and an improved method for making the same.

Heretofore, deposited rubber articles made by dipping or spraying or electro-deposition from rubber-containing liquids have been formed with openings or apertures in a wall thereof by slitting and ring-rolling processes, or by forming weakened areas defining the opening out of which the material in the opening may be torn. The former method is expensive and the latter produces goods with a more or less feathered frayed edge objectionable from the standpoint of appearance and likely to tear inwardly from the edge of the opening.

In accordance with the present invention, the articles are deposited with thickened reinforced lines about an area where an opening is subsequently desired and a smooth, effective reinforcement is provided for the edge of the opening out of which the material is cut or punched, the reinforcement indicating where the material should be cut or punched so as to definitely and uniformly locate the openings. This obviates the disadvantages of prior art constructions and methods and can be easily and economically carried out to produce an improved article.

The foregoing and other purposes of the invention are attained in the article and by the method illustrated in the accompanying drawing and described below. It is to be understood that the invention is not limited to the specific form thereof shown and described.

Of the accompanying drawing:

Figure 1 is an elevation of a form having rubber deposited thereon in accordance with the invention.

Figure 2 is an edge view thereof partly broken away and in section.

Figure 3 is an elevation illustrating a punching operation upon an article made upon said form.

Figure 4 is a similar view illustrating another punching operation on said article.

Figure 5 is a front elevation of the finished article.

Figure 6 is an enlarged section on line 6—6 of Figure 5.

Figure 7 is an enlarged section on line 7—7 of Figure 5, and

Figure 8 is an enlarged section on line 8—8 of Figure 5.

Referring to the drawing, the numeral 10 designates a form which may be shaped to form any desired deposited rubber article in a wall or walls of which it is desired to provide one or more apertures. The particular form shown may be used for making rubber baby pants.

The form 10 is provided with grooves or recesses at 10a and with similar grooves, some of which may be circular as indicated at 11, 11 or elongated as at 12 which define areas at which openings are to be formed in the articles made upon said forms. When form 10 is dipped in a liquid containing rubber, such as liquid latex, or when such liquid is sprayed thereon or rubber electro-deposited thereon out of such liquid, the rubber flows into such grooves or recesses and forms reinforcing ribs on the finished article at 10b and on walls thereof as indicated at 11a and 12a which circumscribe or define areas in the walls of deposited rubber from which the material may be punched or cut to provide openings.

After rubber has been deposited on form 10, it is vulcanized, stripped from the form and trimmed as will be understood by skilled artisans. The areas defined by ribs 11a and 12a may then be located over suitable punch-blocks as indicated respectively at 13 and 14 in Figures 3 and 4 and ribs 11a and 12a provide means for locating punches 15 and 16 respectively so as to cut openings in the article such as leg openings 17, 17 and vent openings 18, 18 (see Figures 5, 7 and 8). These punches are used to punch cleanly through the rubber within or circumscribed by the ribs forming sharp non-frayed edges effectively reinforced by smooth unbroken ribs or beads. As will be apparent the edges of the openings will be at least as thick as the body of the article.

Thus a dipped or deposited rubber article such as baby pants may be effectively provided with reinforced openings such as vent openings and leg openings. It is to be understood that the invention is not limited to baby pants which is only one of many articles which may be made by dipping or like processes and in which openings are desired.

Modifications of the invention may be resorted to without departing from the spirit thereof or the scope of the appended claims.

What is claimed is:

1. That method for making deposited rubber or like articles comprising providing a form with one or more smooth rounded recesses therein having rounded edges at the surface of the form and circumscribing or defining areas in which openings are desired in a wall or walls of the articles, depositing rubber on said form whereby it will flow into said recesses to form smooth rounded ribs on the article, removing the article thus formed from the form, and thereafter cutting openings through said articles within said circumscribing ribs.

2. A deposited rubber or like article, said article being vulcanized and having one or more integral smooth rounded edge ribs thereon circumscribing or defining areas therein in which are openings, the rubber in said areas being cut from within said circumscribing ribs after vulcanization whereby edges at least as thick as the body of the article are produced about said openings.

ELMER C. BRUEGGEMAN.